(12) United States Patent
Hermanson

(10) Patent No.: US 11,699,421 B2
(45) Date of Patent: Jul. 11, 2023

(54) SYSTEM FOR TOUCHLESS MUSICAL INSTRUMENT

(71) Applicant: MR. CHRISTMAS INCORPORATED, New York, NY (US)

(72) Inventor: Terry Hermanson, New York, NY (US)

(73) Assignee: MR. CHRISTMAS INCORPORATED, New York, NY (US)

(*) Notice: Subject to any disclaimer, the term of this patent is extended or adjusted under 35 U.S.C. 154(b) by 385 days.

(21) Appl. No.: 17/038,335

(22) Filed: Sep. 30, 2020

(65) Prior Publication Data

US 2021/0097965 A1 Apr. 1, 2021

Related U.S. Application Data

(60) Provisional application No. 62/907,968, filed on Sep. 30, 2019.

(51) Int. Cl.
| | | |
|---|---|---|
| *G10H 1/055* | (2006.01) | |
| *G10H 1/32* | (2006.01) | |
| *G06F 3/01* | (2006.01) | |

(52) U.S. Cl.
CPC ............ *G10H 1/0553* (2013.01); *G10H 1/32* (2013.01); *G06F 3/011* (2013.01); *G10H 2220/201* (2013.01); *G10H 2220/415* (2013.01); *G10H 2220/421* (2013.01)

(58) Field of Classification Search
CPC .. G10H 1/0553; G10H 1/32; G10H 2220/201; G10H 2220/415; G10H 2220/421; G06F 3/011

USPC ............................................................ 84/724
See application file for complete search history.

(56) References Cited

U.S. PATENT DOCUMENTS

| | | | | | |
|---|---|---|---|---|---|
| 3,749,810 | A | * | 7/1973 | Dow | ........................ G10H 1/34 984/345 |
| 5,459,312 | A | * | 10/1995 | Gurner | ................. G10H 1/0553 250/221 |
| 5,920,024 | A | * | 7/1999 | Moore | ...................... G10H 1/00 356/28 |

(Continued)

FOREIGN PATENT DOCUMENTS

| | | | |
|---|---|---|---|
| CN | 113436592 A | * 9/2021 | |
| GB | 2526278 A | * 11/2015 | ........... G10H 1/0008 |

OTHER PUBLICATIONS

"Speaker See. Speaker do", The Economist, p. 65 (May 11, 2019).

*Primary Examiner* — Christina M Schreiber
(74) *Attorney, Agent, or Firm* — Venable LLP

(57) ABSTRACT

Systems for a touchless musical instrument, where the touchless musical instrument includes: multiple sensors, where each sensor detects a presence of an object within a predetermined distance of the sensor; an audio speaker; a processor electrically connected to the sensors and the audio speaker; and executes instructions on the process to: receive, from the plurality of sensors, an object detection signal indicating a location of the object with respect to the plurality of sensors; generate an audio output signal based on the location of the object indicated by the object detection signal; and generate an audible output from the audio speaker by transmitting the audio output signal to the audio speaker.

20 Claims, 4 Drawing Sheets

(56) References Cited

U.S. PATENT DOCUMENTS

| | | | | |
|---|---|---|---|---|
| RE37,654 E * | 4/2002 | Longo | | G10H 5/007 |
| | | | | 84/645 |
| 7,582,825 B2 * | 9/2009 | Chien | | G09B 15/08 |
| | | | | 84/723 |
| 8,330,474 B2 * | 12/2012 | Vandermeijden | | G06F 3/0443 |
| | | | | 345/173 |
| 9,591,427 B1 * | 3/2017 | Lyren | | G06F 3/013 |
| 10,274,758 B1 * | 4/2019 | Liu | | G02F 1/025 |
| 10,552,116 B2 * | 2/2020 | Reilly | | H03G 3/02 |
| 10,636,398 B2 * | 4/2020 | Lee | | G06F 3/0362 |
| 10,968,073 B1 * | 4/2021 | Alnajjar | | G08B 21/0476 |
| 11,380,294 B2 * | 7/2022 | Ummy | | G01S 15/10 |
| 2004/0200338 A1 * | 10/2004 | Pangrle | | G10H 3/06 |
| | | | | 84/724 |
| 2006/0107826 A1 * | 5/2006 | Knapp | | G10H 1/0066 |
| | | | | 84/724 |
| 2008/0048878 A1 * | 2/2008 | Boillot | | G06F 3/0485 |
| | | | | 381/105 |
| 2014/0251116 A1 * | 9/2014 | Peterson | | G10H 1/0558 |
| | | | | 84/723 |
| 2015/0193193 A1 * | 7/2015 | Khaira | | G06F 3/017 |
| | | | | 381/109 |
| 2015/0332660 A1 * | 11/2015 | Adams | | G10H 1/0066 |
| | | | | 84/645 |
| 2017/0047053 A1 * | 2/2017 | Seo | | G10H 1/053 |
| 2017/0316765 A1 * | 11/2017 | Louhivuori | | G06F 3/014 |
| 2017/0337911 A1 * | 11/2017 | Monsarrat-Chanon | | |
| | | | | G10H 1/342 |
| 2018/0059227 A1 * | 3/2018 | Tan | | G01S 7/497 |
| 2018/0107278 A1 * | 4/2018 | Goel | | G06F 3/0426 |
| 2018/0348879 A1 * | 12/2018 | Kim | | G06F 3/167 |
| 2019/0015982 A1 * | 1/2019 | Kou | | G05B 23/02 |
| 2019/0270023 A1 * | 9/2019 | Matson | | G06F 3/011 |
| 2019/0313178 A1 * | 10/2019 | Mutlu | | G01J 1/0403 |
| 2020/0005742 A1 * | 1/2020 | Bencar | | G06F 3/011 |
| 2021/0097965 A1 * | 4/2021 | Hermanson | | G10H 1/0008 |
| 2021/0210056 A1 * | 7/2021 | Ummy | | G01S 15/10 |
| 2022/0148547 A1 * | 5/2022 | Caswell | | G10H 1/0555 |
| 2022/0189335 A1 * | 6/2022 | Ruffner | | G10H 1/0008 |
| 2022/0208160 A1 * | 6/2022 | Marticorena | | G10H 1/0008 |

* cited by examiner

SYSTEM FOR TOUCHLESS MUSICAL INSTRUMENT

BACKGROUND

1. Technical Field

The present disclosure relates to a musical instrument, and more specifically to a musical instrument which operates without touch.

2. Introduction

Traditional musical instruments, such as drums, pianos, harps, flutes, violins, etc., produce sounds through contact with a human being. This contact can be through touch, such as when an artist touches the keys of a piano; through focused breathing, such as when an artist pushes breath into a harmonica; or through a combination of touch and focused breathing, such as when a trumpet player blows focused air while touching the keys in a particular way.

The theremin was developed as an electronic musical instrument which could be played without physical contact. The theremin operates by using two metal antennas. As a player, who is electrically connected to ground, moves their hands, the values of capacitance between the player's hands and the antennas vary, changing the current in the circuit. The changing current in turn controls the sound being output by a speaker, with one hand controlling volume and the other hand controlling pitch.

One of the issues associated with the theremin is the requirement that the user be physically connected to ground. Depending on the flooring surface, the user's footwear, use of gloves, and other electrical considerations, the ability to successfully create a circuit may be impaired.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example system, configured as disclosed herein, can include: a plurality of sensors, where each sensor detects a presence of an object within a predetermined distance of the sensor; an audio speaker; a processor electrically connected to the plurality of sensors and the audio speaker; and a computer-readable storage medium having instructions stored which, when executed by processor, cause the processor to perform operations comprising: receiving, from the plurality of sensors, an object detection signal indicating a location of the object with respect to the plurality of sensors; generating an audio output signal based on the location of the object indicated by the object detection signal; and generating an audible output from the audio speaker by transmitting the audio output signal to the audio speaker.

An example touchless musical instrument, configured as described herein, can include: a plurality of sensors, where each sensor detects a presence of an object within a predetermined distance of the sensor; an audio speaker; a light; a processor electrically connected to the plurality of sensors and the audio speaker; and a computer-readable storage medium having instructions stored which, when executed by processor, cause the processor to perform operations comprising: receiving, from the plurality of sensors, an object detection signal indicating a location of the object with respect to the plurality of sensors; generating an audio output signal based on the location of the object indicated by the object detection signal; generating an audible output from the audio speaker by transmitting the audio output signal to the audio speaker; and generating an optical output by transmitting the audio output signal to the light.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The touchless musical instrument disclosed herein uses sensors to detect the presence (and/or orientation) of a user's hand over the instrument, the sensors send signals to a processor or other control circuitry, which in turn generates audio and/or visual outputs. To assist with the description of various configurations and embodiments, the disclosure turns to the figures.

Figure 1:
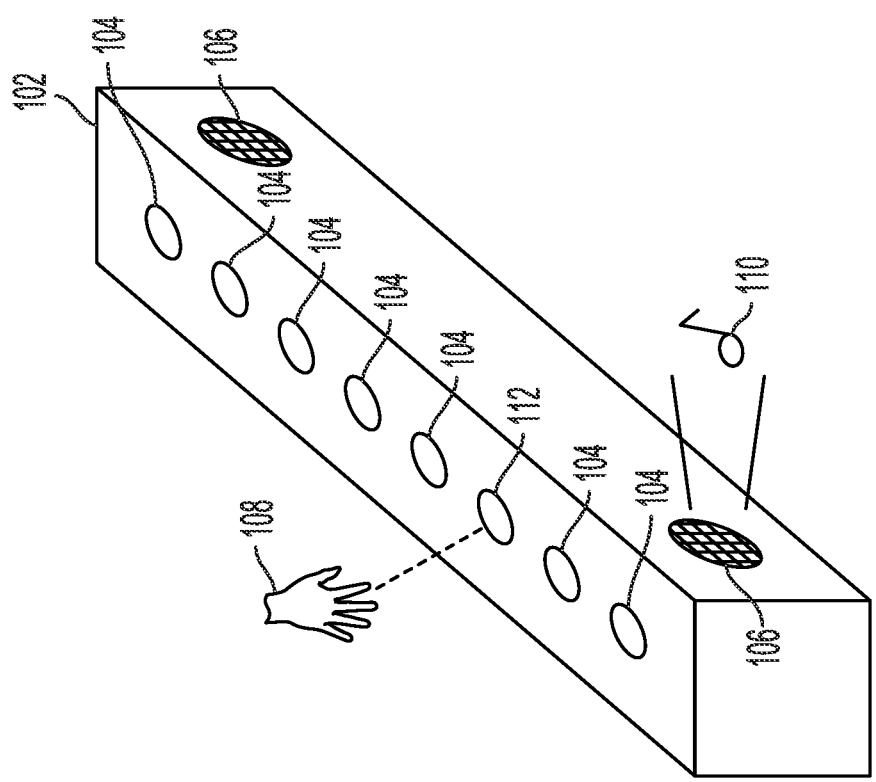
FIG. 1 illustrates a first example system embodiment.

FIG. 1 illustrates a first example system embodiment. In this example, the musical instrument includes a housing 102 with multiple sensors 104, 112 having sensory access through the top of the housing 102. Along the sides of the housing are speakers 106. As a user's hand 108 is detected by a particular sensor 112, the musical instrument generates an audio output 110.

The shape of the housing 102, as illustrated, is rectangular. However, this shape is exemplary only and can vary according to particular configurations. Other exemplary shapes of the housing 102 can include squares, circles, triangles, cones, cylinders, pyramids, spheres, domes, or any other contiguous housing. The housing 102 can include a top, or cover, or can have the sensors 104, 112 exposed to the user.

As illustrated, the speakers 106 are located on the side of the housing 102, perpendicular to the sensory direction of the sensors 104, 112. However, the location of the speakers 106 can vary according to particular configurations. For example, the speakers 106 may be located on the top of the housing 102, broadcasting audio output in the same direction as the sensors. Likewise, the speakers 106 may be located only on the ends of the housing 102, may be present on each side of the housing 102, or may be present on each face of the housing 102. There may be multiple speakers 106 on any given face of the housing 102, and the respective speakers 106 may be identical to one another or may have distinct audio output qualities (e.g., some may be for high frequency audio output, and others may be for low frequency audio output).

The types of the sensors 104, 112 can include, but are not limited to: motion sensors, infrared sensors, photo sensors, and laser sensors. In some configurations, multiple types of sensors can be used together, such as infrared sensors together with photo sensors, or laser sensors together with motion sensors. While the precise detection range of the various sensors can vary based on specific configuration or type of sensors used, preferably the sensors 104, 112 can detect the presence of a user's hand 108 when the hand 108 is in immediate contact with the sensor 104, 112 (that is, when the user is touching the sensor or the housing 102 top covering the sensors 104, 112), or when the user's hand 108 is within 1-2 meters of the sensor 104, 112.

As the user's hand 108 is detected by a particular sensor 112 housed in the housing 102, the particular sensor 112 generates a detection signal, which is forwarded to a processor or other control circuitry within the housing 102. Based on the presence of the hand 108, the processor then forwards a signal to the speaker 106, which generates audio output 110. In some configurations, the pitch of the audio output 110 can vary based on which sensor or sensors detect the user's hand 108 and the volume of the audio output 110 can vary based on the distance between the user's hand 108 and the respective sensors. In other configurations this can be reversed, such that the pitch varies based on distance between the user's hand 108 and the sensor 112, while the volume varies based on which sensor or sensors detects the hand 108.

As illustrated, sensor 112 is detecting the hand 108 while the remaining sensors 104 do not. However, in other examples multiple sensors 104, 112 may simultaneously detect the hand 108 and transmit corresponding signals to the processor. Where multiple sensors simultaneously detect the hand 108, the system can either identify the "center" or middle sensor as being the sensor associated with the hand 108 position, thereby producing only a single auditory signal based on that single sensor, or the system can generate a blend of multiple auditory signals based on the respective detection strength of each sensor detecting the hand 108. For example, if the hand 108 is being detected as 80% within the range of a first sensor and 20% within the range of a second sensor, the system can do an 80-20 blend of the sounds corresponding to each respective sensor.

In some configurations, the orientation or shape of the hand 108 can affect volume, pitch, or other sound effect of the audio output 110. For example, if the hand 108 is flat that may indicate one pitch, and if the hand is curled into a cup that may indicate another pitch.

As illustrated, the sensors 104, 112 are arranged in a line. In other configurations the sensors 104, 112 may be arranged in other patterns or configurations. For example, the sensors 104, 112 may be arranged in concentric circles to form a drum-like instrument. As the user's hand 108 moves toward the concentric circle of sensors 104, 112, the sensors 104, 112 can detect that the hand 108 is moving closer to the instrument and produce a drum sound. If the user where to only move their hand 108 toward the edge of such an instrument, the audio output can change in volume, pitch, etc., similar to how a standard drum's sound would change between a strike to the middle of the drum's face and a strike to the side of the drum's face. In other configurations the sensors 104, 112 may be arranged around a sphere, as concentric squares or rectangles, in a triangular configuration, or in any other manner as necessary for a particular design.

In some configurations, the housing 102 can also have built in lights, such as LEDs (Light Emitting Diodes), which produce light effects based on the hand 108 movement(s) of the user. For example, the user may move their hand 108, the sensors 104, 112 may detect the movement, and in addition to producing audio output 110, the system may produce a light effect based on the hand 108 movement. Depending on a specific configuration, the light effect can be synchronized to change with the generated audio output 110, or may be delayed or otherwise operate distinctly from the audio output 110. Examples of light effects include turning on/off lights to create flashing, changing colors, changing tones, fading, etc. An example of synchronization between the audio output 110 and the light effect can be a synchronous shift in the light color corresponding to a shift in the audio pitch caused by the user's hand 108 movement.

Figure 2:
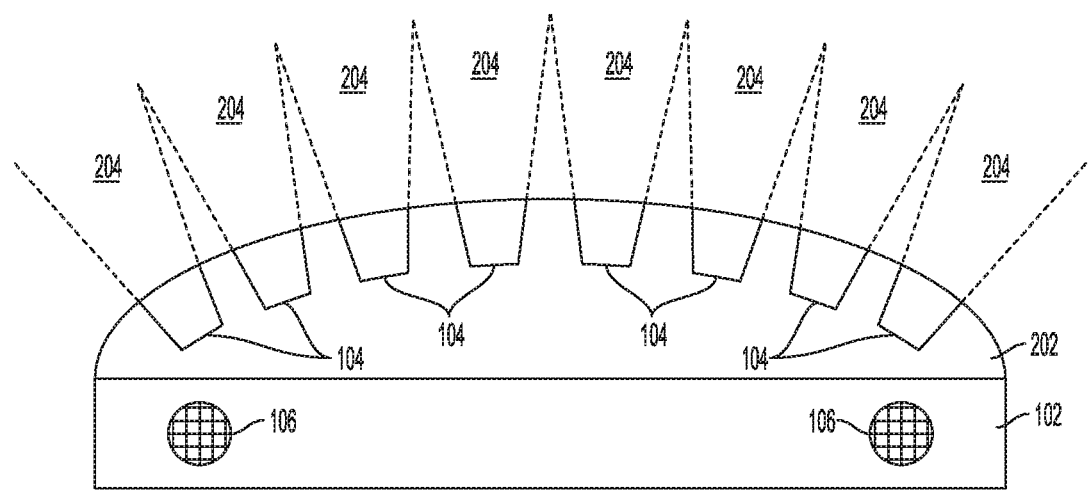
FIG. 2 illustrates a second example system embodiment.

FIG. 2 illustrates a second example system embodiment. In this example, the housing 102 is again displayed with speakers 106. However, in this example the housing cover 202, or top, forms a dome shape (also referred to as a rounded vault shape) covering the housing 102. In this example, the curved nature of the dome-shaped cover 202 allows the sensors 104 to each have an angle of detection which changes based on the location of the sensor 104 on the cover 202. This allows each sensor 104 to have a unique angle of detection with respect to the other sensors 104, which also results in distinct areas of coverage 204 further out from the instrument than if the sensors 104 are all pointed in the same direction.

The housing cover 202 can be formed using various materials. For example, the housing cover 202 can be a mirror, where the user can see a reflection of themselves or their environment; the housing cover 202 can be glass, plastic, or another transparent material which allows the user to see the interior components 104 of the housing 102; the housing cover 202 can be porous, meaning that it has solid portions as well as open portions ("holes") corresponding to the sensors 104; or the housing cover 202 can be a non-transparent, non-reflective, contiguous material. In yet configurations, the housing cover 202 can be made of multiple materials. For example, a portion of the housing cover 202 can be a mirror while another portion of the housing cover 202 can be non-reflective.

Figure 3:
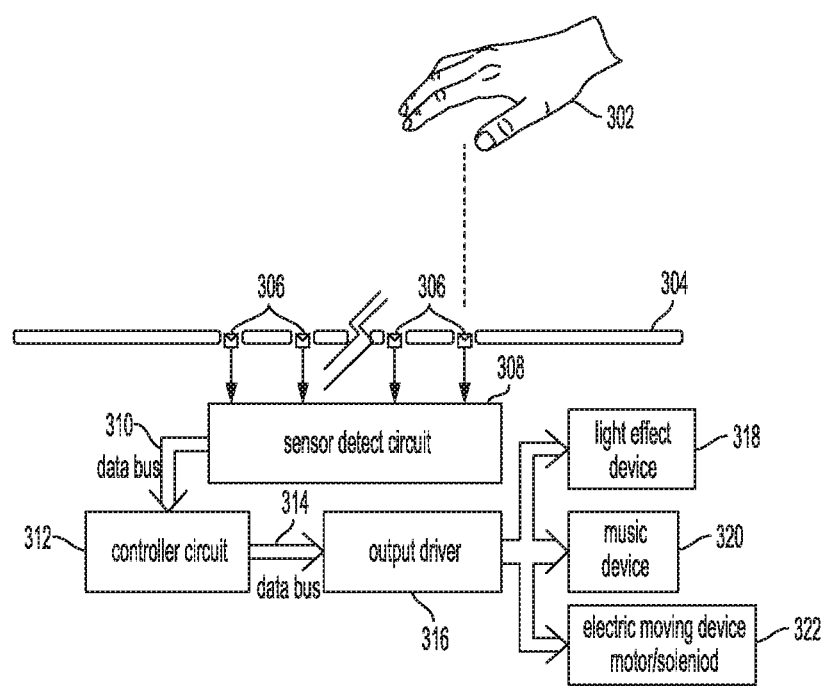
FIG. 3 illustrates a third example system embodiment.

FIG. 3 illustrates a third example system embodiment which illustrates some of the components enabling the audio output or light effects. In this example, the user's hand 302 is moved over the instrument's top or cover 304. Built into (or integrated with) the cover 304 are sensors 306 which detect the movement (or presence) of the user's hand 302. As the sensors 306 detect the movement or presence of the user's hand 302, they send an electrical signal to the sensor detection circuit 308. The sensor detection circuit 308 compiles the respective sensor data and transmits, over a data bus 310, the data to a controller circuit 312 where determinations regarding what type of outputs (audio and/or visual) should be generated are made. The controller circuit 312 then transmits, over a data bus 314 (which may or may not be the same bus 310 used to exchange signals between the sensor detection circuit 308 and 312) instructions to an output driver 316 to prepare output signals. The output driver 316 then generates signals as instructed by the controller circuit 312 for the light effect device 318 (such as one or more lights), the music/audio output device 320 (such as one or more speakers), and any electric moving device 322, such as a motor or solenoid or other moving parts.

Please note that the example components provided in FIG. 3 may not be present in all embodiments or configurations. For example, in some configurations, a single processor may be used for the sensor detection circuit 308, the controller circuit 312, and/or the output driver 316. Likewise, in some configurations, there may only be the music device 320 and the electric moving device 322, lacking the light effect device 318. In other configurations, there may be multiple devices (e.g., multiple speakers, multiple lights, and/or multiple solenoids) which receive control signals from the output driver 316.

Figure 4:
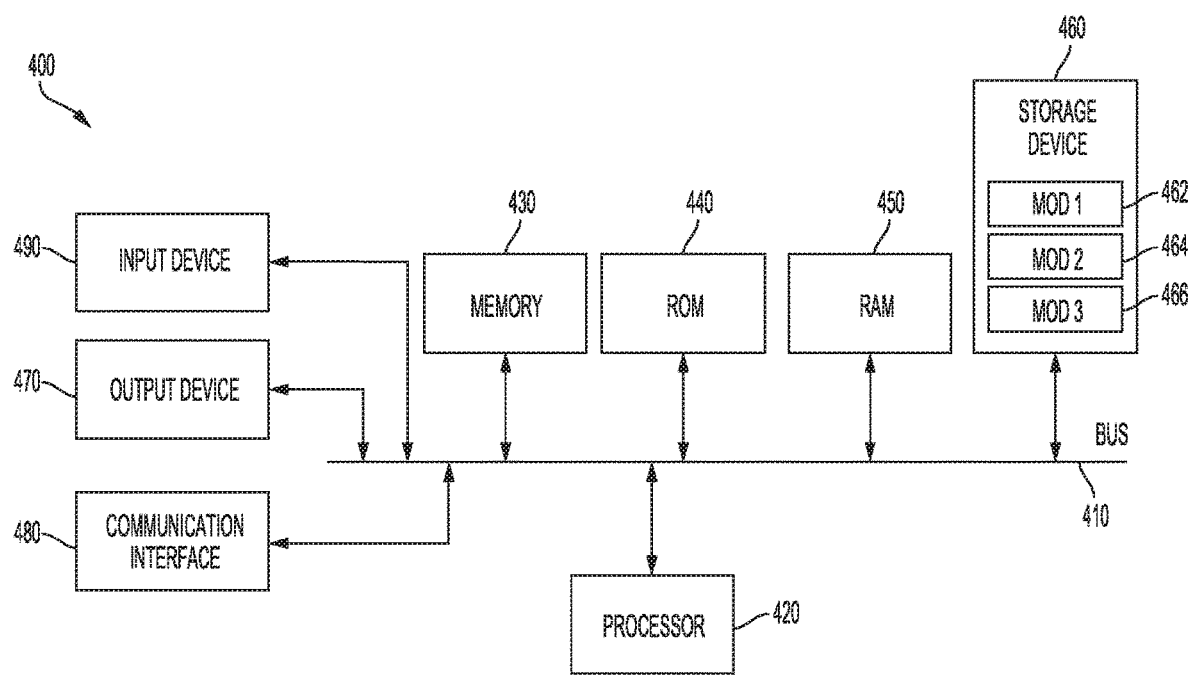
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A system comprising:
    a plurality of sensors, where each sensor detects a presence of an object within a predetermined distance of the sensor;
    an audio speaker;
    a processor electrically connected to the plurality of sensors and the audio speaker;
    a computer-readable storage medium;
    a housing containing the audio speaker, the processor, and the computer-readable storage medium;
    a housing top having the plurality of sensors integrated into the housing top, the housing top physically coupled to the housing,
    wherein the computer-readable storage medium has instructions stored which, when executed by processor, cause the processor to perform operations comprising:
        receiving, from the plurality of sensors, an object detection signal indicating a location of the object with respect to the plurality of sensors;
        generating an audio output signal based on the location of the object indicated by the object detection signal; and generating an audible output from the audio speaker by transmitting the audio output signal to the audio speaker.

2. The system of claim 1, wherein the plurality of sensors are at least one of infrared sensors or motion sensors.

3. The system of claim 1, wherein the plurality of sensors are photo sensors.

4. The system of claim 1, wherein the plurality of sensors are laser sensors.

5. The system of claim 1, wherein the audible output varies in pitch based on the location of the object with respect to the plurality of sensors, wherein the object is a hand of an individual person.

6. The system of claim 5, the computer-readable storage medium having additional instructions stored which, when executed by the processor, cause the processor to perform additional operations comprising:
   identifying, based on the object detection signal, an orientation of the hand with respect to the plurality of sensors; and
   modifying a volume of the audible output based on the orientation of the hand.

7. The system of claim 1, wherein the audible output varies in volume based on the location of the object with respect to the plurality of sensors.

8. The system of claim 7, wherein the object is a hand of an individual person, and the computer-readable storage medium has additional instructions stored which, when executed by the processor, cause the processor to perform additional operations comprising:
   identifying, based on the object detection signal, an orientation of the hand with respect to the plurality of sensors; and
   modifying a pitch of the audible output based on the orientation of the hand.

9. The system of claim 1, wherein the object detected by the plurality of sensors is a hand of a user.

10. The system of claim 1,
    wherein:
      the housing top has a rounded vault shape; and
      the plurality of sensors are arranged at angles based on the rounded vault shape of the housing top, such that each sensor in the plurality of sensors detects objects at a unique angle with respect to other sensors in the plurality of sensors.

11. A touchless musical instrument comprising:
    a plurality of sensors, where each sensor detects a presence of an object within a predetermined distance of the sensor;
    an audio speaker;
    a light;
    a processor electrically connected to the plurality of sensors and the audio speaker;
    a computer-readable storage medium;
    a housing containing the audio speaker, the processor, and the computer-readable storage medium; and
    a housing top having the plurality of sensors integrated into the housing top, the housing top physically coupled to the housing,
    wherein the computer-readable storage medium has instructions stored which, when executed by the processor, cause the processor to perform operations comprising:
      receiving, from the plurality of sensors, an object detection signal indicating a location of the object with respect to the plurality of sensors;
      generating an audio output signal based on the location of the object indicated by the object detection signal;
      generating an audible output from the audio speaker by transmitting the audio output signal to the audio speaker; and
      generating an optical output by transmitting the audio output signal to the light.

12. The touchless musical instrument of claim 11, wherein the plurality of sensors are at least one of infrared sensors or motion sensors.

13. The touchless musical instrument of claim 11, wherein the plurality of sensors are photo sensors.

14. The touchless musical instrument of claim 11, wherein the plurality of sensors are laser sensors.

15. The touchless musical instrument of claim 11, wherein the audible output varies in pitch based on the location of the object with respect to the plurality of sensors, wherein the object is a hand of an individual person.

16. The touchless musical instrument of claim 15, the computer-readable storage medium having additional instructions stored which, when executed by the processor, cause the processor to perform additional operations comprising:
    identifying, based on the object detection signal, an orientation of the hand with respect to the plurality of sensors; and
    modifying a volume of the audible output based on the orientation of the hand.

17. The touchless musical instrument of claim 11, wherein the audible output varies in volume based on the location of the object with respect to the plurality of sensors.

18. The touchless musical instrument of claim 17, wherein the object is a hand of an individual person, and the computer-readable storage medium has additional instructions stored which, when executed by the processor, cause the processor to perform additional operations comprising:
    identifying, based on the object detection signal, an orientation of the hand with respect to the plurality of sensors; and
    modifying a pitch of the audible output based on the orientation of the hand.

19. The touchless musical instrument of claim 11, wherein the object detected by the plurality of sensors is a hand of a user.

20. The touchless musical instrument of claim 11,
    wherein:
      the housing top has a rounded vault shape; and
      the plurality of sensors are arranged at angles based on the rounded vault shape of the housing top, such that each sensor in the plurality of sensors detects objects at a unique angle with respect to other sensors in the plurality of sensors.

* * * * *